US010619856B2

(12) United States Patent
McCormick et al.

(10) Patent No.: US 10,619,856 B2
(45) Date of Patent: Apr. 14, 2020

(54) NOTCHED GAS TURBINE COMBUSTOR COWL

(71) Applicant: Rolls-Royce Corporation, Indianapolis, IN (US)

(72) Inventors: Keith Alan McCormick, Indianapolis, IN (US); Paul Ashley Denman, Leicestershire (GB)

(73) Assignee: Rolls-Royce Corporation, Indianapolis, IN (US)

( * ) Notice: Subject to any disclaimer, the term of this patent is extended or adjusted under 35 U.S.C. 154(b) by 294 days.

(21) Appl. No.: 15/809,835

(22) Filed: Nov. 10, 2017

(65) Prior Publication Data

US 2018/0259186 A1  Sep. 13, 2018

Related U.S. Application Data

(60) Provisional application No. 62/470,783, filed on Mar. 13, 2017.

(51) Int. Cl.
F23R 3/04 (2006.01)
F23R 3/28 (2006.01)
(Continued)

(52) U.S. Cl.
CPC ............. *F23R 3/286* (2013.01); *F23R 3/04* (2013.01); *F23R 3/14* (2013.01); *F23R 3/283* (2013.01); *F23R 3/50* (2013.01); *Y02T 50/675* (2013.01)

(58) Field of Classification Search
CPC .. F23R 3/002; F23R 3/04; F23R 3/045; F23R 3/06; F23R 3/10; F23R 3/14; F23R 3/283; F23R 3/286; F23R 3/50
See application file for complete search history.

(56) References Cited

U.S. PATENT DOCUMENTS 3,854,285 A * 12/1974 Stenger ................ F23R 3/04
                                                      60/756
4,843,825 A *  7/1989 Clark .................. F23R 3/002
                                                      60/756
(Continued)

FOREIGN PATENT DOCUMENTS

EP     2 806 217 A2    11/2014
FR     2 909 163 A1     5/2008
(Continued)

OTHER PUBLICATIONS

European Office Action, issued in European Patent Application No. 18 157 528.3, dated Jun. 27, 2019, pp. 1-5, European Patent Office, Rijswijk, Netherlands.
(Continued)

*Primary Examiner* — William H Rodriguez
(74) *Attorney, Agent, or Firm* — Brinks Gilson & Lione

(57) ABSTRACT

A gas turbine engine includes a combustion system. The combustion system may include a combustor positioned in a chamber created by an outer wall. A compressor, such as a centrifugal compressor may provide a flow of compressed air into the chamber along an inner surface of the outer wall since an inlet for the flow of compressed air is outboard of the combustor. The pressurized flow of air may be redirected by a cowl included in the chamber. The cowl may include a collar defining a notch in the cowl. The collar may redirect the flow of pressurized air so as to minimize a high velocity component of the flow of pressurized air flowing radially toward a central axis of the engine prior to entering a head of a fuel nozzle included in the combustion system.

20 Claims, 10 Drawing Sheets

(51) Int. Cl.
*F23R 3/50* (2006.01)
*F23R 3/14* (2006.01)

(56) References Cited

U.S. PATENT DOCUMENTS

| | | | | |
|---|---|---|---|---|
| 4,979,361 A | * | 12/1990 | Clark | F23R 3/04 |
| | | | | 60/751 |
| 5,279,126 A | | 1/1994 | Holladay | |
| 5,285,630 A | * | 2/1994 | Ansart | F23R 3/04 |
| | | | | 60/39.23 |
| 5,331,815 A | * | 7/1994 | Reinhold, Jr. | F23R 3/04 |
| | | | | 60/39.11 |
| 5,924,288 A | | 7/1999 | Fortuna et al. | |
| 6,449,952 B1 | | 9/2002 | Emilianowicz et al. | |
| 8,661,829 B2 | | 3/2014 | Bourgois et al. | |
| 9,127,841 B2 | | 9/2015 | Bourgois et al. | |
| 2008/0098737 A1 | * | 5/2008 | Haggerty | F02C 7/22 |
| | | | | 60/740 |
| 2015/0285498 A1 | * | 10/2015 | Cunha | F02C 7/18 |
| | | | | 60/752 |
| 2017/0016620 A1 | | 1/2017 | Masquelet et al. | |
| 2019/0093893 A1 | * | 3/2019 | Clemen | F23R 3/10 |

FOREIGN PATENT DOCUMENTS

| | | |
|---|---|---|
| FR | 2 964 725 A1 | 3/2012 |
| GB | 694448 | 7/1953 |
| WO | WO 2010/105999 A1 | 9/2010 |

OTHER PUBLICATIONS

Extended European Search Report, dated Jul. 27, 2018, pp. 1-6, issued in European Patent Application No. 18157528.3, European Patent Office, The Hague, The Netherlands.
Arthur H. Lefebvre et al., "Gas Turbine Combustion Alternative Fuels and Emissions", 2010—CRC Press—Taylor & Francis Group, pp. 1-560.

* cited by examiner

NOTCHED GAS TURBINE COMBUSTOR COWL

CROSS-REFERENCE TO RELATED APPLICATIONS

This application is a non-provisional application which claims priority under 35 USC § 119(e) to U.S. provisional application 62/470,783, "CHAMBER FED COMBUSTOR COWL" filed Mar. 13, 2017, which is entirely incorporated by reference.

TECHNICAL FIELD

This disclosure relates to gas turbine engines and, in particular, to a chamber fed combustor cowl.

BACKGROUND

Jet engines may include a compressor. Typically, the compressor is an air compressor rotating on a shaft of the jet engine to provide air for the combustion cycle. The compressor in a jet engine may be an axial compressor, a centrifugal compressor or a mixed flow compressor. The compressor may include one or more stages and may include rotating blades and stationary vanes. Air compressed by the compressor is provided to a combustion chamber where it is mixed with fuel that is burned. In addition, the compressed air may be used for cooling.

SUMMARY

An example of a gas turbine engine includes a fuel nozzle that includes a head and a stem. The stem is configured to supply fuel to the head positioned at a proximate end of the stem. The gas turbine engine may also include a combustion system comprising an outer wall defining at least part of a chamber, a distal end of the stem configured to couple with the outer wall. The stem configured to extend through the outer wall into the chamber so as to rigidly hold the head in position at an entrance to a combustor included in the chamber. The gas turbine engine may further include a compressed air source configured to provide a pressurized flow of air into the chamber along an inner surface of the outer wall. The gas turbine engine may also include a cowl positioned in the chamber to direct at least part of the pressurized flow of air to the head. The cowl may be formed to include a notch through which at least part of the stem extends. An edge of the cowl defining the notch comprising a collar formed to extend from a surface of the cowl to direct the flow of air around the notch and to an inlet of the head.

Another example of a gas turbine engine includes a combustion system. The combustion system may include an outer wall and an inner wall defining a chamber, an air inlet, and an air outlet. The air inlet may be at the outer wall. The gas turbine engine may also include a combustor disposed in the chamber between the outer wall and the inner wall, and a fuel nozzle comprising a head disposed in an inlet of the combustor and a stem extending from the inlet of the combustor to the outer wall. The gas turbine engine further including a cowl positioned between an external surface of the combustion chamber and the outer wall, the cowl including a collar formed along a peripheral edge of the cowl as a notch to partially surround the stem.

Another example is a method of operating a gas turbine engine. The method includes positioning a combustor in a chamber formed by an outer combustion case and an inner combustion case. The method also includes coupling a stem of a fuel nozzle to the outer combustion case, and extending the stem of the fuel nozzle into the chamber such that a head of the fuel nozzle is disposed in an inlet of the combustor. The method further includes supplying a flow of compressed air to the chamber by supplying the flow of compressed air at an inner surface of the outer combustion case. The method also includes redirecting the flow of compressed air with a cowl positioned between the outer combustion case and the combustion chamber. The cowl includes a notch defined by a collar partially surrounding the stem. The method further describes redirecting the flow of compressed air around the notch with the collar.

Other systems, methods, features and advantages will be, or will become, apparent to one with skill in the art upon examination of the following figures and detailed description. It is intended that all such additional systems, methods, features and advantages be included within this description, be within the scope of the invention, and the following claims

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A jet engine, such as an axial flow gas turbine engine includes a combustion system. Air may be fed from a compressor to a chamber included in the combustion system. A combustor, such as an annular combustor or flame tube, may be positioned within the chamber. Fuel nozzles may extend into the chamber and be coupled with an inlet of the combustor. A flow of compressed air may be supplied into the chamber along an inner surface of an outer wall defining at least part of the chamber. Once in the chamber, the pressurized flow of air may be directed to flow in a direction along a centerline of fuel nozzle swirlers included in the fuel nozzles, to avoid subjecting the fuel nozzle swirlers to high velocity components of the pressurized flow of air that are normal to the centerline of the fuel nozzle swirlers. Such high velocity components normal to the centerline may cause a poor distribution of air flow being fed to the fuel nozzle, which may cause poor flame stability.

Figure 1:
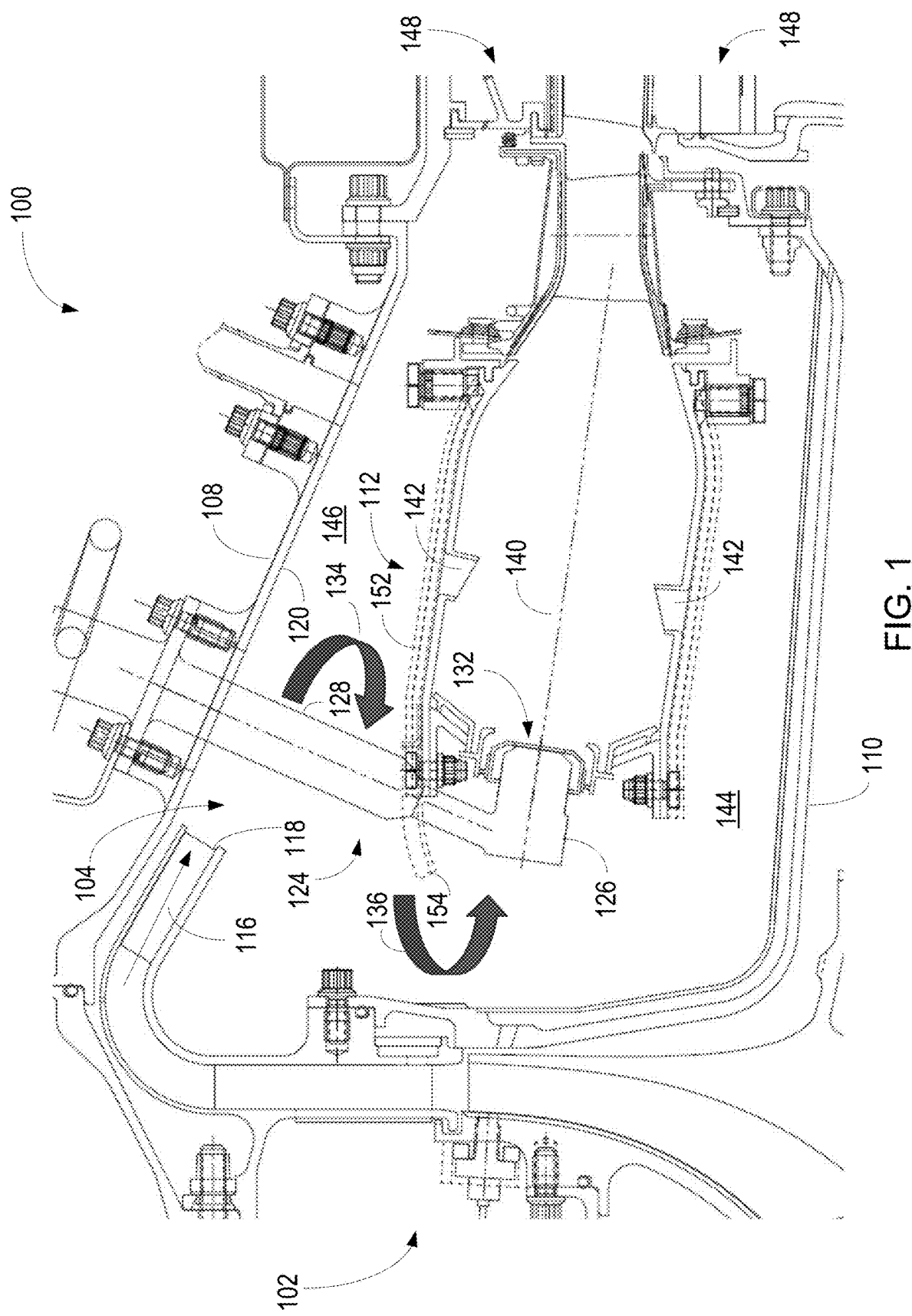
FIG. 1 is a cross-section of an example of a combustion system included in a gas turbine engine.

FIG. 1 is a cross-section of an example of a combustion system 100 included in a gas turbine engine. A source of compressed air 102, such as a compressor, may provide a pressurized flow of air into a chamber 104 defined by an outer wall 108 and an inner wall 110 that together form a combustion case. A combustor 112 may be positioned in the chamber 104. The source of compressed air 102 may provide a pressurized flow of air 116 at an outlet 118 such that the pressurized flow of air 116 flows into the chamber 104 along an inner surface 120 of the outer wall 108. In the illustrated example, the source of compressed air 102 may be a compressor in the form of an axial centrifugal compressor configuration, such that the compressor outlet 118 or exit is positioned outboard of the combustor 112. In other examples, other sources of compressed air may be used such that that the pressurized flow of air 116 flows into the chamber 104 along an inner surface 120 of the outer wall 108. In other example configurations, the source of compressed air may provide a pressurized flow of air that flows into the chamber 104 along an outer surface of the inner wall 110. The engine may be a combustion engine that generates thrust, such as an axial flow gas turbine engine.

A fuel nozzle 124 may include a head 126 positioned at a proximate end of the fuel nozzle 124 in an inlet 132 of the combustor 112. A stem 128 included as part of the fuel nozzle 124 may extend from the head 126 through the outer wall 108 at a distal end of the fuel nozzle 124, and be coupled with a flange or other coupling mechanism position at the outer wall 108. At least a part of the flow of compressed air entering the chamber 104 may reverse direction, or change direction, such as by about 180 degrees, as illustrated by arrow 134 to flow toward the inlet 132 of the combustor 112. Once flowing in a direction back toward the compressor 102, or front of the combustion system 100, the pressurized flow of air may again reverse direction, or change direction, such as by about 180 degrees, as illustrated by arrow 136 to flow, for example, substantially axially along a centerline 140 of the head 126. It is to be noted that the reversal of direction of the flow of air is not limited to about 180 degrees, and that a range of turning angles, flowing in different reversal directions such as within a range of 90 to 180 degrees, are possible. Some of the flow of pressurized air may also flow through mixing jets 142 into the combustor 112, or flow in an inner annulus 144 and an outer annulus 146 as cooling air toward an outlet 148 of the chamber 104.

A cowl 152 may be coupled with the combustor 112, and may redirect the flow of pressurized air toward the head 126 as illustrated by arrows 134 and 136. In other examples, the cowl 152 may be included as part of the combustor 112. The cowl 152 may extend along the combustor 112 such that a projecting region 154 of the cowl 152 extends beyond an end of the combustor 112 to be positioned between the outer wall 108 and the head 126. Accordingly, the flow of pressurized air that completes the first direction reversal illustrated by arrow 134 flows beyond the projection region 154 of the cowl 152 before completing the second direction reversal illustrated by arrow 136 to flow toward the head 126 positioned in the inlet 132 of the combustor 112. Thus, any high velocity flow of pressurized air flowing normal to the head 126 is deflected by the projecting region 154 so as to not come radially inward toward the head 126 at high velocity.

Figure 2:
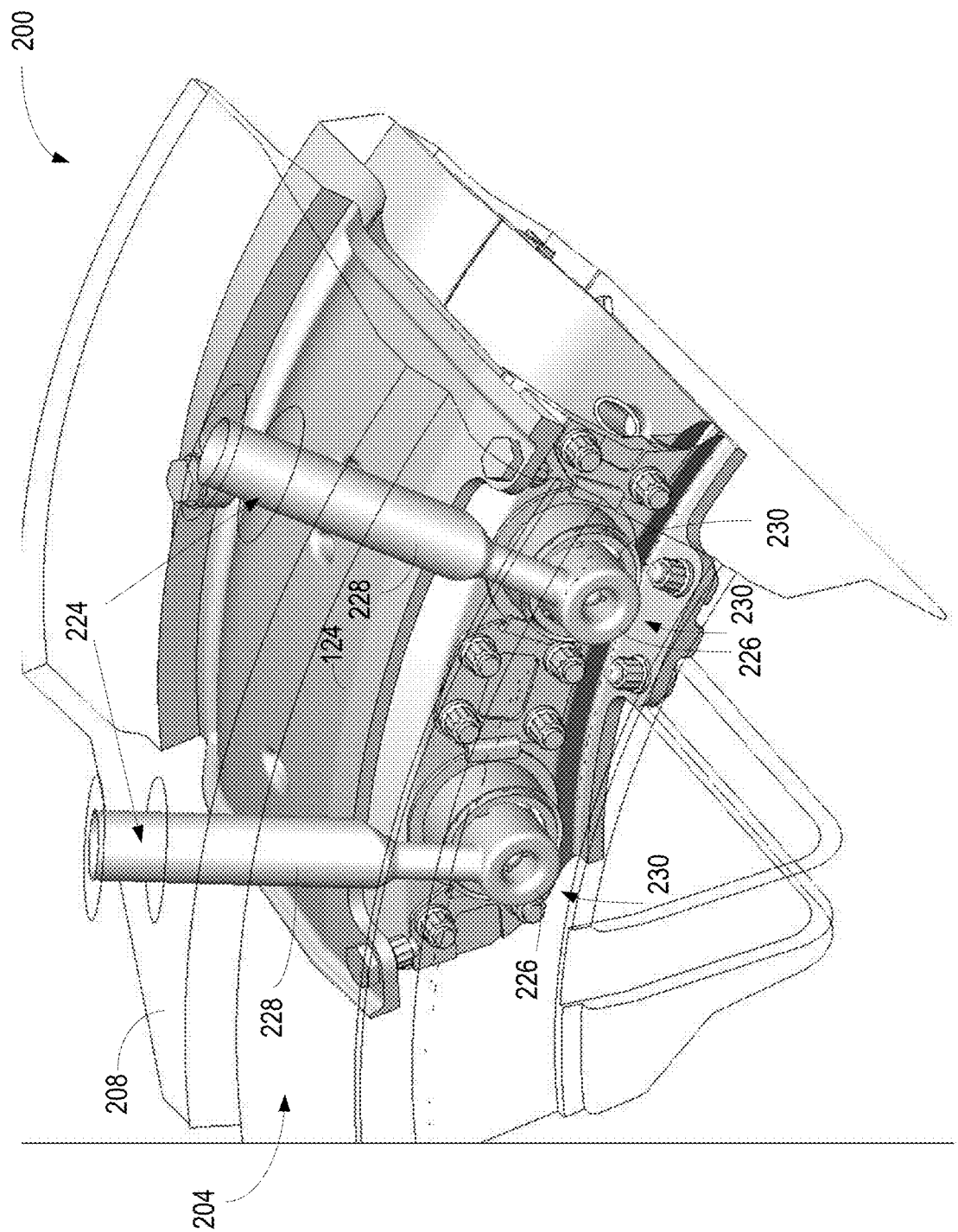
FIG. 2 is a perspective view of a portion of an example combustion system included in a gas turbine engine.

FIG. 2 is a perspective view of a portion of an example combustion system 200 included in a gas turbine engine. The combustion system 200 includes an outer wall 208 (illustrated in phantom) housing a combustor 212 and fuel nozzles 224 within a chamber 204. Each of the fuel nozzles 224 includes a head 226 and a stem 228. In this example combustion system a cowl, similar to the cowl 152 of FIG. 1 has been omitted. Similar to the example of FIG. 1, an outlet of a source of a pressurize flow of air, such as a compressor, may be positioned outboard of the combustor 212 such that a pressurized flow of air is supplied at an inner surface of the outer wall 208.

One or more fuel nozzle swirlers 230 may be positioned in or surrounding the heads 226. For example, a first fuel nozzle may be positioned within each of the heads 226, and second and third fuel nozzle swirlers may be positioned to surround a portion of the heads 226, as illustrated in FIG. 2. In other examples additional or fewer fuel nozzle swirlers 230 may be included. Each of the fuel nozzle swirlers 230 may include a plurality of vanes to direct the flow of pressurized air into the combustor 212. In general, the fuel nozzle swirler(s) 230 may create a toroidal flow reversal that entrains and recirculates a portion of the hot combustion products to mix with the incoming air and fuel. This recirculation may be created by vortex breakdown in a core region, or central axis region, of an exit flow of the fuel nozzle 224 within the combustor 112.

Figure 3:
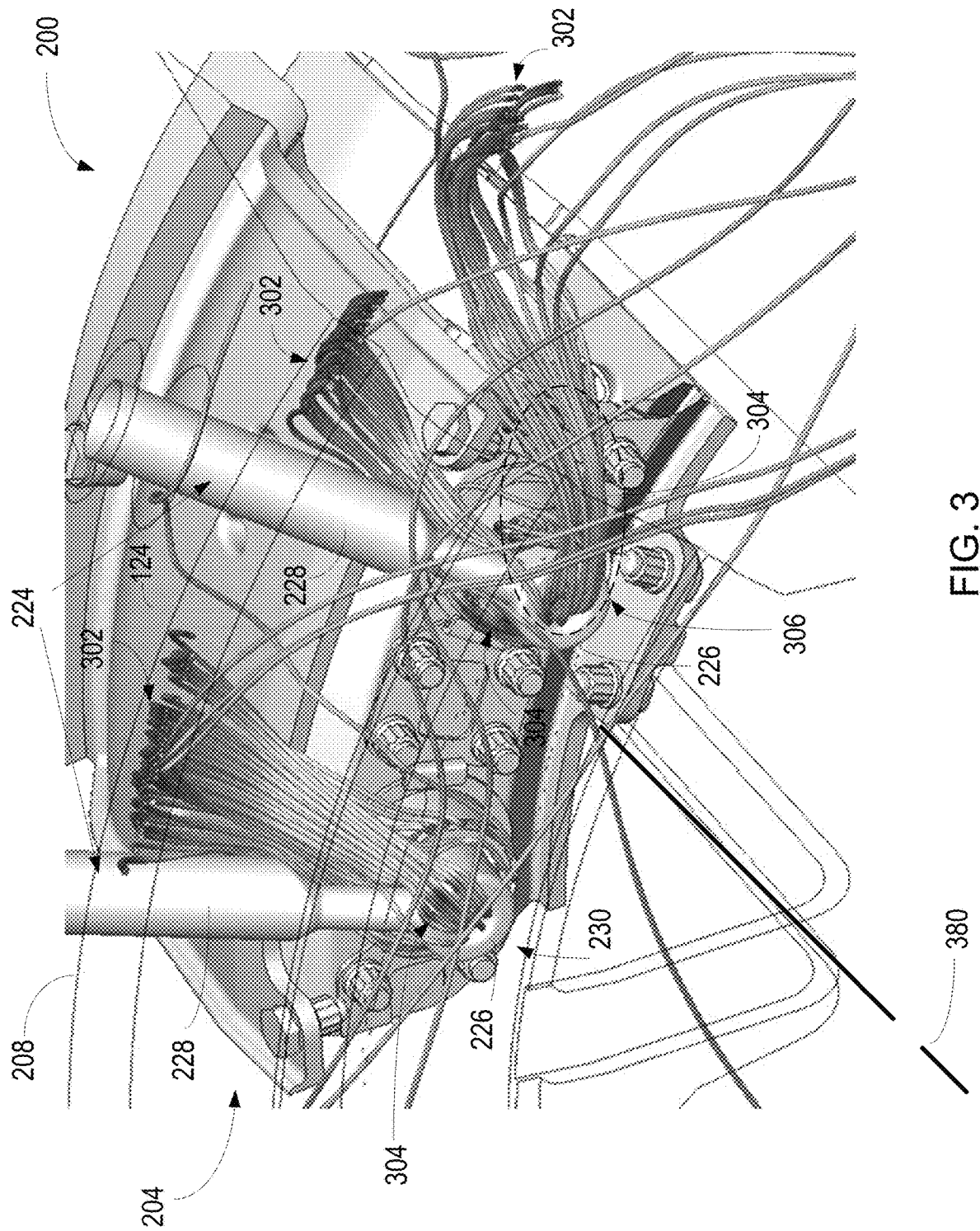
FIG. 3 is another perspective view of the portion of the example combustion system illustrated in FIG. 2 during a simulation of operation.

FIG. 3 is another perspective view of the portion of the example combustion system 200 (FIG. 2) during a simulation of operation in which streamlines of a pressurized flow of air is illustrated. In FIG. 3, the streamlines of the flow of air is illustrated as strands with varying shading to illustrate variation in velocity magnitude such that darker shading represents a lower velocity magnitude of air flow, and lighter shading represents a higher velocity magnitude of air flow. Similar to FIG. 1, a portion of a pressurized flow of air entering the chamber 204 may perform a first direction reversal 302 to flow toward the heads 226 and then may perform a second direction reversal 304 to enter the heads 226 as illustrated. Because the cowl has been omitted, a significant component of the pressurized flow of air feeding into the head 226 approaches the heads 226 radially inwardly toward a centerline 380 of the engine at a relatively high velocity so as to complete the second direction reversal 304 on or near a surface of the head 226. Another component of the flow of pressurized air, however, performs the second change of direction 304 spaced away from the head 226 (as indicated by the dotted circle 306 in FIG. 3) due to flowing tangentially with respect to the centerline 380 of the engine and with relatively lower velocity so as to avoid entering the head 226 with a radially inward high velocity component.

Figure 4:
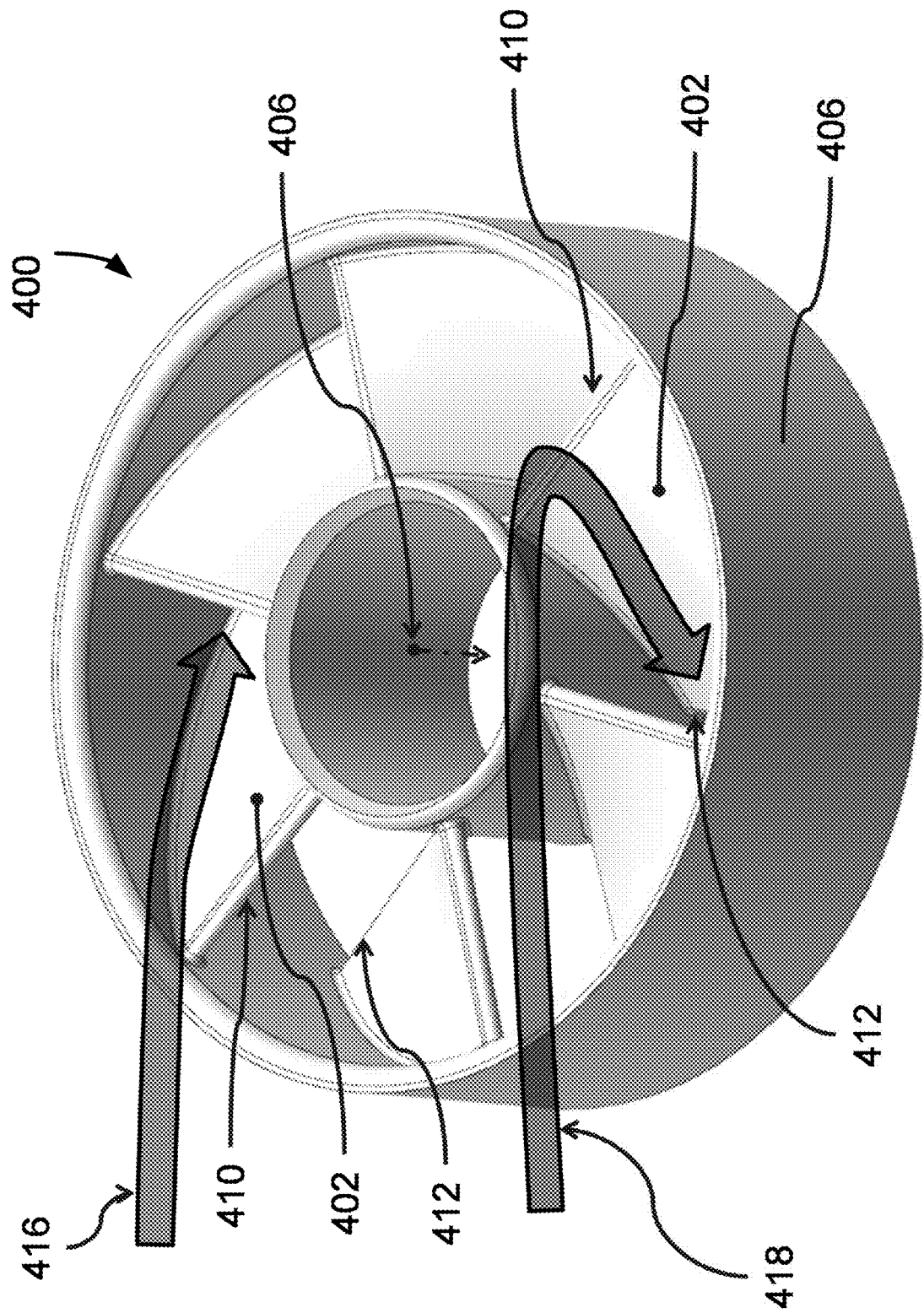
FIG. 4 is a block diagram schematic illustrating an example of a fuel swirler.

FIG. 4 is a block diagram schematic illustrating an example of a fuel swirler 400. The example fuel swirler 400 includes a plurality of swirler vanes 402 arranged and positioned in a passageway in the head of the fuel nozzle. In other examples, the fuel swirler may be positioned to receive or surround a portion of the head of the fuel nozzle. In the illustrated example, the swirler vanes 402 are positioned radially in the passageway to be concentric with a central axis 406 of the fuel swirler 402. The central axis 406 may align with the central axis 140 (FIG. 1) of the head of the fuel nozzle. Each of the swirler vanes 402 may be formed as a sheet comprised of a leading edge 410 at the inlet to the fuel swirler 400 and a trailing edge 412 at a different circumferential location and displace along the axis 406. The shape of the sheet between the leading edge 410 and the trailing edge 412 can be helical or a variety of shapes to optimize design. The thickness of the vane 402 can be a constant dimension or vary across the sheet to optimize design.

The swirler vanes 402 are evenly distributed around axis 406 to form a swirler structure, which is circular in FIG. 4. It is desirable that the flow of pressurized air approach the leading edge 410 of each of the swirler vanes 402 at the same orientation. Due to the varying orientation of the swirler vanes 402 in the swirler structure, however, each of the vanes 402 may receive, or be fed, a flow of pressurized air differently as the air flow approaches the head of the fuel nozzle normal to the axis 406.

For example, in FIG. 4, a first flow of pressurized air 416 at relatively high velocity must turn only slightly, or substantially maintaining a same flow direction, to enter a swirler flow passage between two vanes 402, and a second flow of pressurized air 418 at a relatively high velocity must nearly fully reverse flow, or substantially change the flow direction, to enter one of the swirler flow passages. The example first and second flows of pressurized air 416 and 418 are two more extreme differences in orientation of flows approaching the head of the fuel nozzle, which will cause more extreme relative differences in flow magnitude and direction exiting the flow passages. This variation in flow may occur to varying degree in each of the swirler flow passages depending on the orientation of the vane. It is desirable to minimize the velocity approaching the swirler normal to the axis 406 in order to minimize the effect of orientation.

Figure 5:
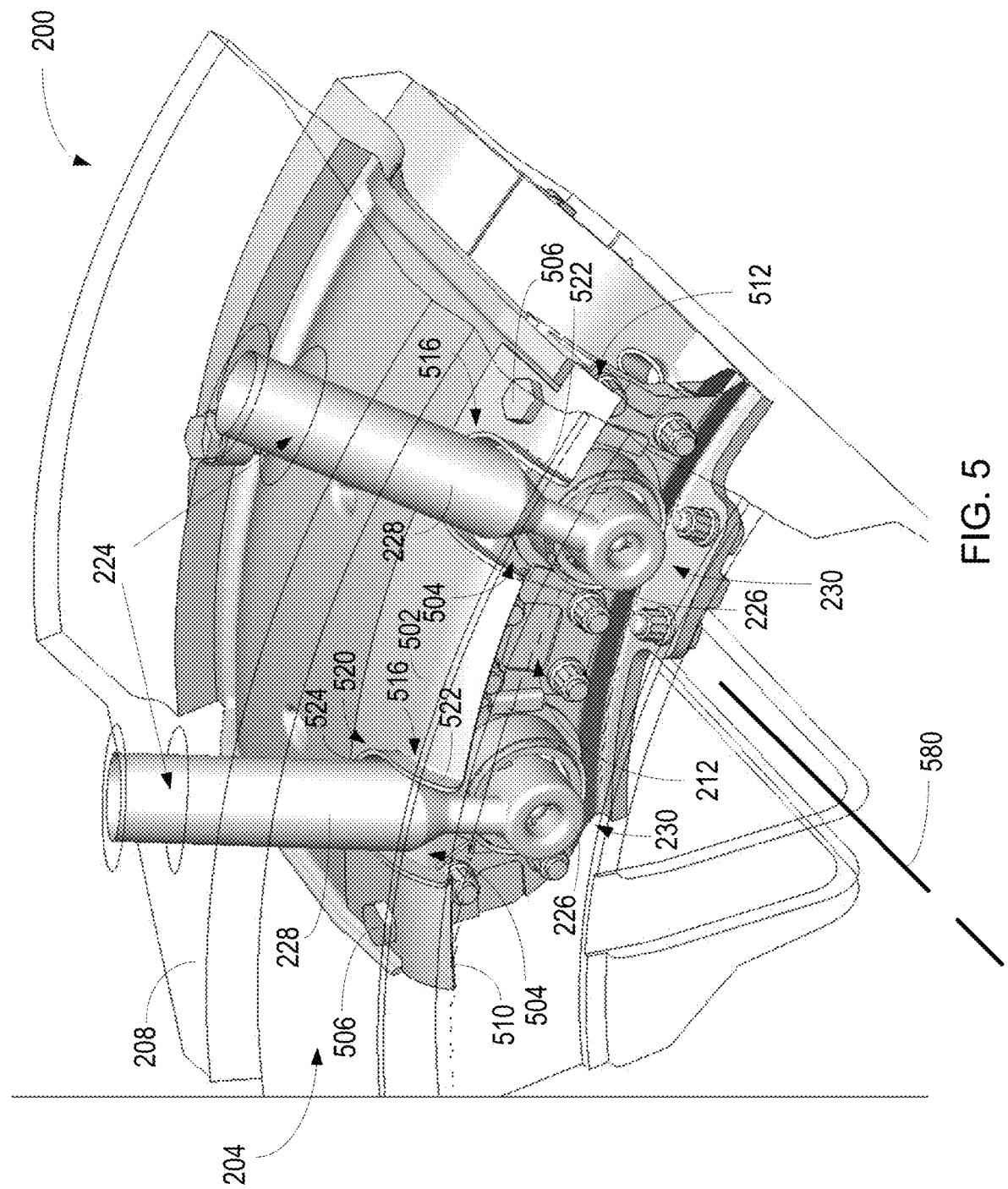
FIG. 5 is a perspective view of a portion of an example combustion system included in a gas turbine engine, which includes a cowl.

FIG. 5 is a perspective view of a portion of an example combustion system 500 included in a gas turbine engine, which includes a cowl 502. Similar to the combustion system 200 of FIG. 2 in which the cowl was omitted, the combustion system 500 includes an outer wall 208 (illustrated in phantom) housing a combustor 212 and fuel nozzles 224 within a chamber 204. Each of the fuel nozzles 224 includes a head 226 and a stem 228, and one or more fuel nozzle swirlers 230. Similar to the example of FIG. 1, an outlet of a source of a pressurize flow of air, such as a compressor, may be positioned outboard of the combustor 212 such that a pressurized flow of air is supplied at an inner surface of the outer wall 208. Alternatively, an outlet of a source of a pressurize flow of air, such as a compressor, may be positioned inboard of the combustor 212 such that a pressurized flow of air is supplied at an outer surface of the inner wall.

The cowl 502 may be similar to the cowl 154 illustrated in FIG. 1. The cowl 502 may be positioned in the chamber 204 to direct at least part of the pressurized flow of air to the heads 226. The cowl 502 may be formed to include a notch 504 through which the stem 228 of the fuel nozzles 224 extends. The cowl 502 may be positioned between the combustor 212 and the outer wall 208. The cowl 502 may be coupled with the combustor 212 by fasteners 506 and extend laterally away from the combustor 212 to a peripheral edge 510 to form a projection region 512 similar to FIG. 1. The projection region 512 may extend away from the housing of the combustor 212 to form an overhang or cover between the heads 226 and the outer wall 208. In other examples, the cowl 502 may be formed as part of the combustor 212.

The notch 504 is defined by a collar 516 which is formed to extend from a surface of the cowl 502. As illustrated in FIG. 5, the collar 516 may be formed as a continuous unitary part of the cowl 502. The collar 516 may be a continuous wall extending orthogonally to the surface of the cowl toward the outer wall 208, and direct the flow of pressurized air around the notch 504. The collar 516 may include a closed end 520 partially surrounding a portion of the stem 228. An apex 524 of the closed end 520 may define the depth of the notch 504 and may be aligned with the direction of the pressurized air flow. The closed end 520 may be round and formed with a predetermine radius to partially surround the stem 228 at a predetermined distance to minimize air flow into the notch 504. In addition, the collar 516 may include sidewalls 522 extending from the closed end 520 to the peripheral edge 510 of the cowl 502 to form an open end of the notch 504 and redirect the air flow. The collar 516 is formed to extend above the surface of the cowl 502 in order to redirect the flow of pressurized air away from (or around) the notch 504 to avoid a radial flow of pressurized air through the notch 504 to the head 226 of the fuel nozzle 224.

Figure 6:
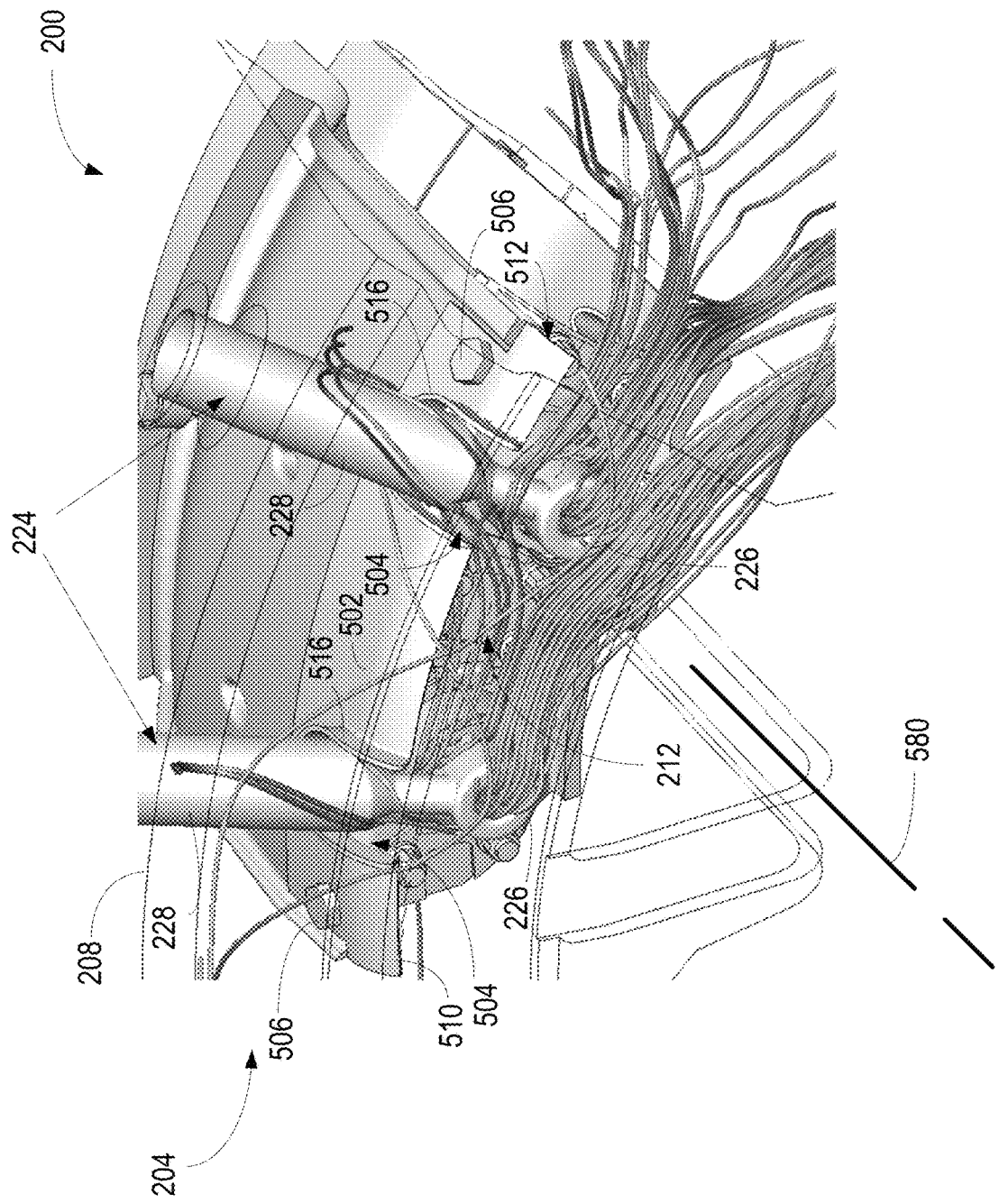
FIG. 6 is another perspective view of the portion of the example combustion system of FIG. 5 during a simulation of operation.

FIG. 6 is another perspective view of the portion of the example combustion system 200 in FIG. 5, during a simulation of operation in which streamlines of a pressurized flow of air are illustrated. In FIG. 6, similar to FIG. 3, the streamlines of the flow of air are illustrated as strands with varying shading to illustrate variation in velocity magnitude such that darker shading represents a lower velocity magnitude of air flow, and lighter shading represents a higher velocity magnitude of air flow. In contrast to FIG. 3, where the cowl was omitted, however, the majority of the flow of pressurized air performs a second direction reversal away from the head 226 of the fuel nozzle 224 at relatively low velocity due to the cowl 502 and the collar 516. Thus, the pressurized flow of air is provided at a front end of the combustion system in a direction toward a back end of the combustion system along the inner surface of the outer wall 208, and the head 226 of the fuel nozzle 224 is also positioned near the front of the combustion system such that the at least part of the pressurized flow of air flows back toward the front end of the combustion system and is directed to the head 226 with substantially lower relative velocity due to the cowl 502 and the collar 516.

In sharp contrast to FIG. 3, due to the flow of pressurized air being redirected by the cowl 502 and the collar 516, very little of the pressurized flow of air flowing at relatively high velocity approaches the heads 226 radially inward toward a centerline 580 of the engine at a relatively high velocity by completing the second direction reversal 304 on a surface of the head 226. Thus, there is only a relatively small component of pressurized air flowing with a high radial velocity normal to the centerline 140 (FIG. 1) of the head 226 at the time of entering the head 226. Another significantly greater component of the flow of pressurized air, however, performs the second change of direction 304 spaced away from the head 226 (as indicated by the dotted circle 306 in FIG. 3) so as to have a relatively lower velocity by flowing tangentially to the centerline 580 before entering the head 226 normal to the centerline 440. As a result, referring to FIG. 4, a relative majority component of the flow of pressurized air is the first flow of pressurized air 416 first received at the apex 412 of the swirler vanes 402.

Figure 7:
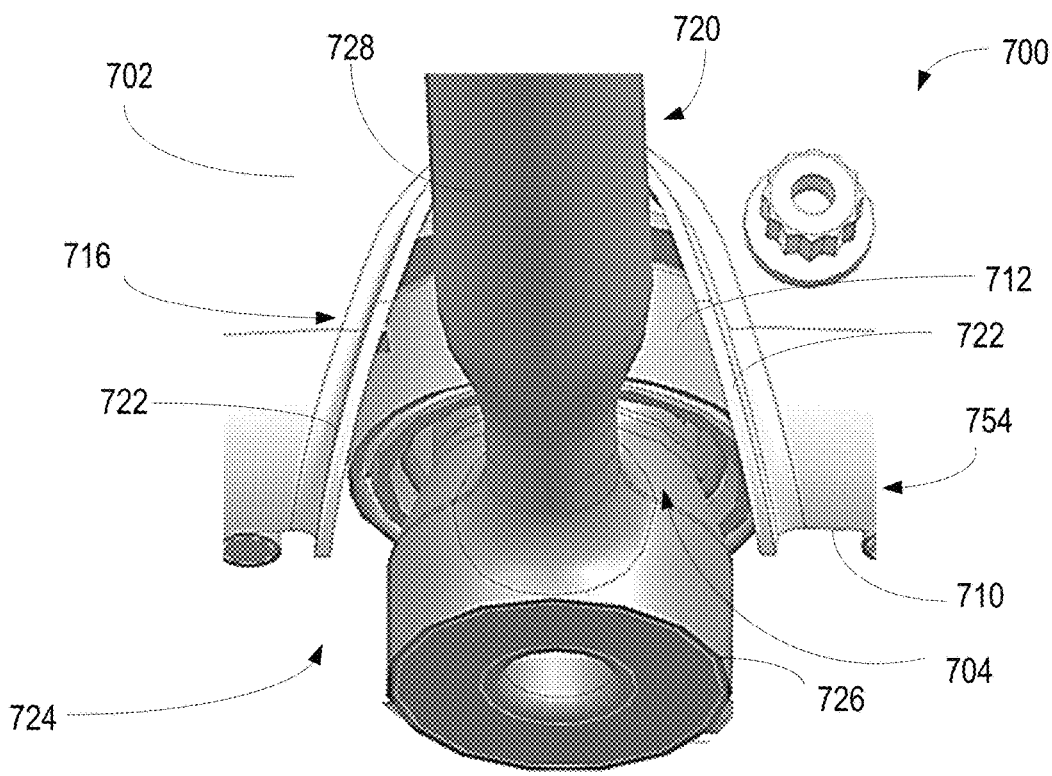
FIG. 7 is a perspective top view of a portion of an example combustion system illustrating an example of a cowl, a fuel nozzle having a head and a stem, and a combustor.

FIG. 7 is a perspective top view of a portion of an example combustion system 700 illustrating an example of a cowl 702, a fuel nozzle 724 having a head 726 and a stem 728, and a combustor 712. The cowl 702 is formed to include a notch 704 defined by a collar 716 formed as part of the cowl 702.

In FIG. 7, the closed end 720 of the notch 704 is round to form a portion of an ellipse shape having a radius to partially surround the stem 728 at a predetermined distance. The distance should be as close as possible as defined by the mechanical tolerance stack (tolerances of the components in the vicinity of the fuel nozzle) and the hot and cold states for the geometry. The coverage of the part of the collar 516 surrounding a portion of the stem 728 is greater than half the circumference of the stem 728, as defined by a circumferential portion of a cylinder that intersects the cowl 502. Where the cylinder is defined as on axis with the fuel nozzle stem 728 and at a radius coincident with the peripheral edge 710 of the cowl 502. A pair of sidewalls 722 may be tapered laterally outward to extend from the closed end 720 to a peripheral edge 710 of the cowl 702. Thus, the width of the notch 704 may become larger toward the peripheral edge 710 to accommodate removal/installation of the fuel nozzle 724.

The distance between adjacent collars 716 formed on the cowl 702 should be greater than width of the gap of the notch 704 at the peripheral edge 710. The progressively wider width of the notch 704 may allow removal of the fuel nozzle 724 for activities such as maintenance or replacement. Due to relatively small space between the stem and the closed end 720, the fuel nozzle 724 may be moved toward the peripheral edge 710 to create enough surrounding space to remove the fuel nozzle 724 from the combustor 712. The cowl 702 includes a projection region 754 extending beyond the end of the combustor 712 a predetermined distance. The projection region 754 may extend to, or beyond, the head 726 of the fuel nozzle 724 during hot conditions. For example, the projection region 754 may extend beyond the end of the combustor 712 a predetermined distance that minimizes radial flow of high velocity pressurized air toward the centerline of the engine and into the head 726 by forming an overhang or cover between the head 726 and the outer wall 208 (FIG. 2). Accordingly, pressurized high velocity air that has been re-directed by the cowl 702 and collar 716 may enter the head 726 at substantially lower velocity due to the majority of the flow of air being re-directed to flow tangentially with the centerline of the engine prior to entering the head parallel with the centerline of the head 726, thereby minimizing a minority component of high velocity radial flow normal to the centerline.

Figure 8:
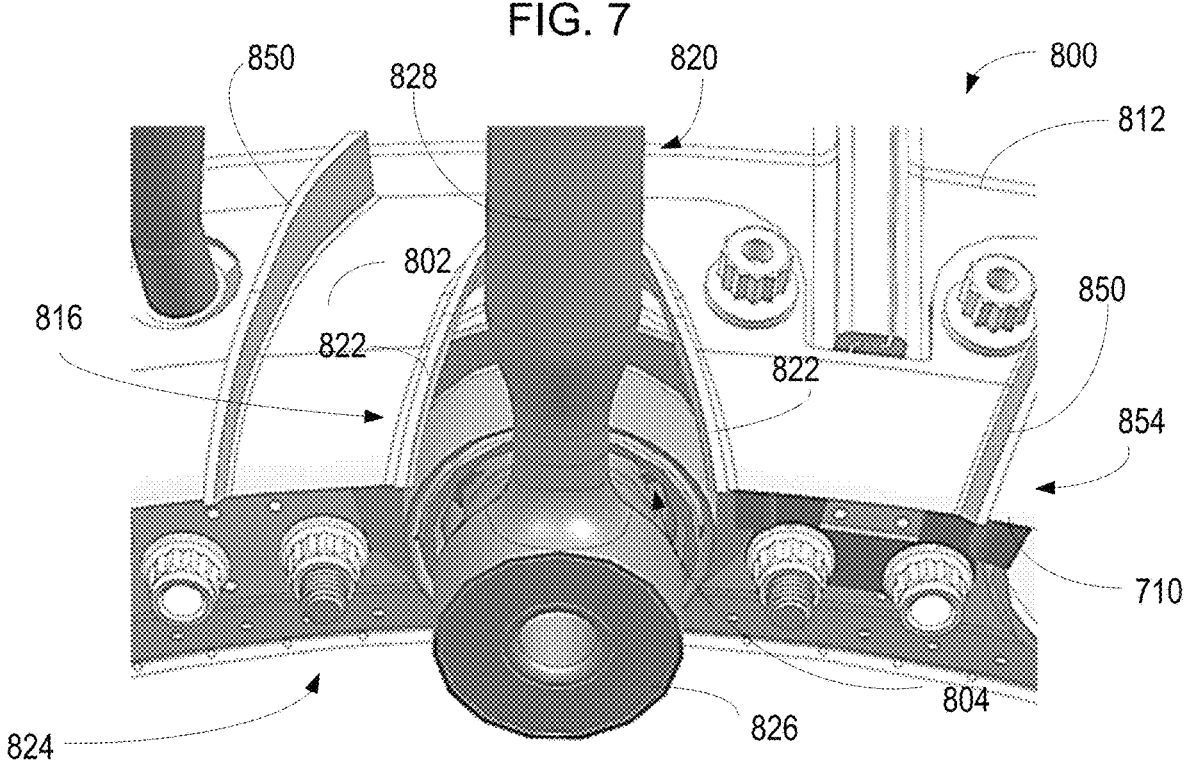
FIG. 8 is a perspective top view of a portion of another example combustion system illustrating an example of a cowl, a fuel nozzle having a head and a stem, and a combustor.

FIG. 8 is another perspective top view of a portion of an example combustion system 800 illustrating an example of a cowl 802, a fuel nozzle 824 having a head 826 and a stem 828, and a combustor 812. The cowl 802 is formed to include a notch 804 defined by a collar 816 formed as part of the cowl 802. In addition, the cowl 802 may include at least one vane 850. Similar to FIG. 7, in this example, a closed end 820 of the notch 804 forms a portion of an ellipse shape having a radius to partially surround the stem 828 at a predetermined distance, and a pair of sidewalls 822 may be tapered laterally outward to extend from the closed end 720 to a peripheral edge 810 of the cowl 802

The vane 850 may extend orthogonally from the surface of the cowl 802 to further redirect the flow of pressurized air. The height of the vane 850 may vary. In the example of FIG. 8, the vane 850 extends progressively further from the surface of the cowl 802 as the vane 850 laterally extends along the surface of the cowl 802 away form a peripheral edge 810 of the cowl 802. The vane 802 may also be formed as a curved wall, as illustrated in FIG. 8, or as a straight wall, in accordance with the desired redirection of the flow of pressurized air. Although only two vanes 850 are illustrated in FIG. 8, in other examples, any number of vanes 850 with varying height, length and radius of curvature may be disposed on the surface of the cowl 802 to redirect the majority component of the flow of pressurized air to flow with relatively lower velocity tangentially to a centerline of the engine prior to reaching the head 826. The vane 850 may extend over a projection region 854.

Figure 9:
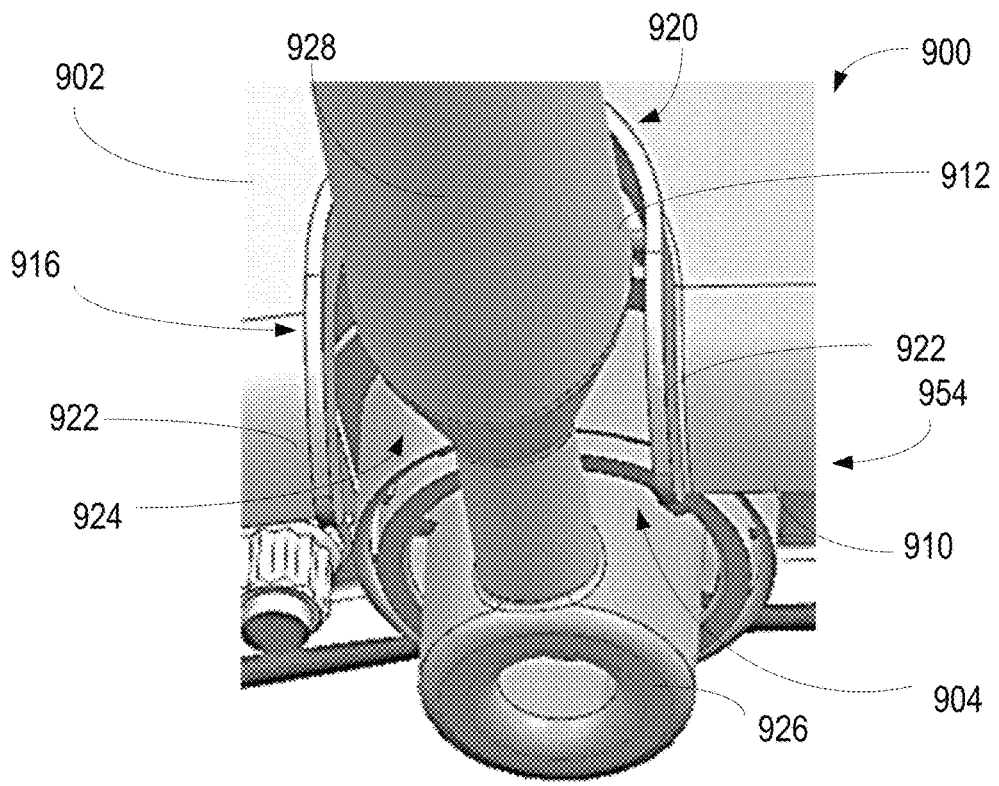
FIG. 9 is a perspective top view of a portion of yet another example combustion system illustrating an example of a cowl, a fuel nozzle having a head and a stem, and a combustor.

FIG. 9 is a perspective top view of a portion of another example combustion system 900 illustrating an example of a cowl 902, a fuel nozzle 924 having a head 926 and a stem 928, and a combustor 912. Similar to the previously discussed examples, the cowl 902 includes a collar 916 defining a notch 904. For purposes of brevity, the discussion will focus on differences with the previously discussed combustion systems.

In FIG. 9, the collar 916 is formed with a closed end 920 to form a portion of a circle shape having a radius to partially surround the stem 928 at a predetermined distance. The predetermined distance should maintain the collar 916 as close as possible to the stem 928 at the closed end 920, as defined by the mechanical tolerance stack and the hot and cold states for the geometry. The coverage of the collar 916 surrounding the stem 928 at the closed end 920 should be greater than half the circumferential outer surface of the stem 928, as defined by the circumferential portion of a cylinder that intersects the cowl 902. Where the cylinder is defined as on axis with the fuel nozzle stem 928 and at a radius coincident with the peripheral edge 910 of the collar. As in previous examples, the distance between the stem 928 and the collar 916 is relatively small in the closed end 920 to minimize the flow of pressurized air into the notch 904. A pair of sidewalls 922 may be spaced equidistantly and extending in parallel from the closed end 920 to a peripheral edge 910 of the cowl 902. Thus, the width of the notch 904 may remain constant between the closed end 920 and the peripheral edge 910 to allow for installation and removal of the fuel nozzle 924, while still minimizing the distance between the collar 916 and the stem 928. In this example configuration, the fuel nozzle 924 may be moved away from the closed end 920, and out of the notch 904 for maintenance, removal or installation.

Figure 10:
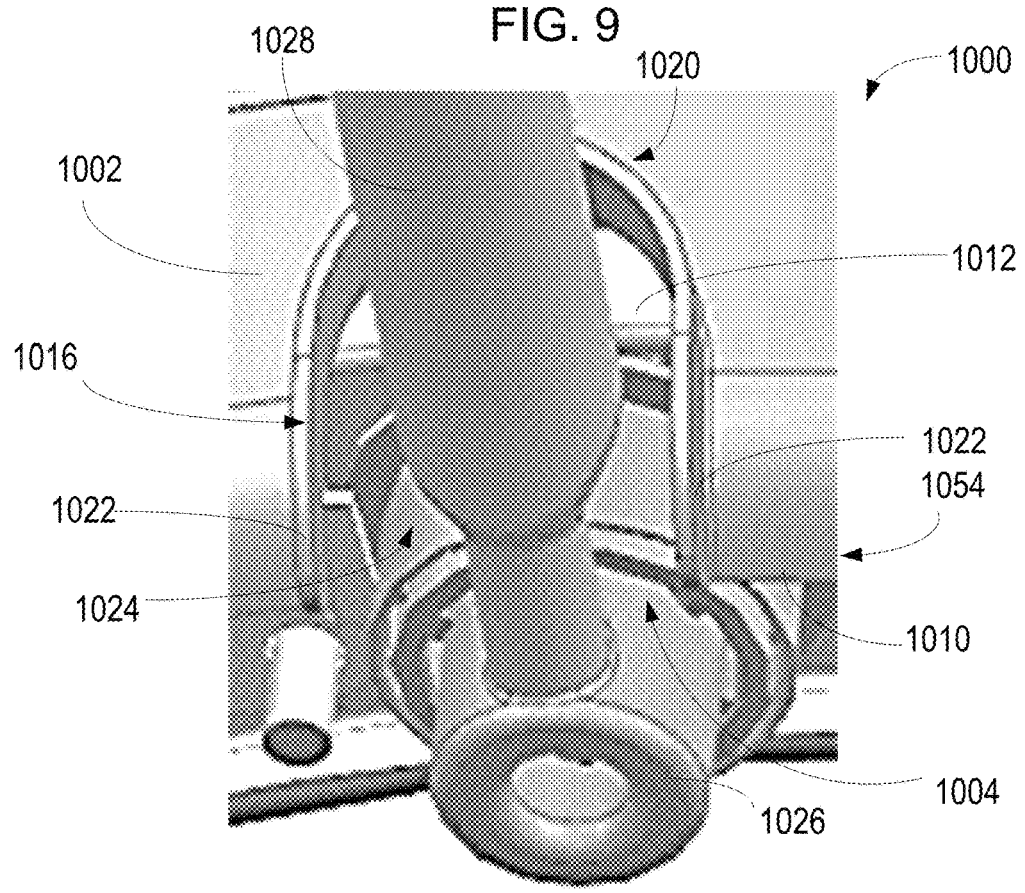
FIG. 10 is a perspective top view of a portion of still another example combustion system illustrating an example of a cowl, a fuel nozzle having a head and a stem, and a combustor.

FIG. 10 is a perspective top view of a portion of another example combustion system 1000 illustrating an example of a cowl 1002, a fuel nozzle 1024 having a head 1026 and a stem 1028, and a combustor 1012. Similar to the previously discussed example, the cowl 1002 includes a collar 1016 defining a notch 1004. For purposes of brevity, the discussion will focus on differences with the previously discussed combustion systems.

In FIG. 10, the collar 1016 is formed with a closed end 1020 to form a portion of a circle shape having a radius to partially surround the stem 1028 at a predetermined distance. The distance between the closed end 1020 and the fuel nozzle stem 1028 should be as close as possible as defined by the mechanical tolerance stack and the hot and cold states for the geometry, while the distance between the opposing side walls 1022 should only be wide enough to allow fuel nozzle 1024 removal and insertion. The coverage of the closed end 1020 of the collar 1016 should be greater than half of the circumferential surface of the stem 1028, as defined by the circumferential portion of a cylinder that intersects the cowl 1002. Where the cylinder is defined as on axis with the fuel nozzle stem 1028 and at a radius coincident with the peripheral edge 1010 of the cowl 1002. In this example, the distance between the stem 1028 and the collar 1016 is relatively large compared to previous examples to allow for installation and removal of the fuel nozzle 1024.

Actual distances between components are dependent on the fuel nozzle geometry, tolerance stack, and hot/cold geometry variations. In addition, all of the distances are dependent on the engine design. Similar to FIG. 9, a pair of sidewalls 1022 may be spaced equidistantly and extending from the closed end 1020 to a peripheral edge 1010 of the cowl 1002. This design may be used, for example, when there is not sufficient clearance to move the fuel nozzle 1024 out of the notch 1004 for maintenance, installation or removal. In other words, if there is insufficient clearance to move the fuel nozzle 1024 forward enough (out of the notch 1004), the notch 1004 may be formed with a gap around the fuel nozzle 1024 that is large enough to get the head 1026 of the fuel nozzle 1024 out radially within the sidewalls 1022 that extend from the closed end 1020 through the projection region 1054 to the peripheral edge 1010.

Figure 11:
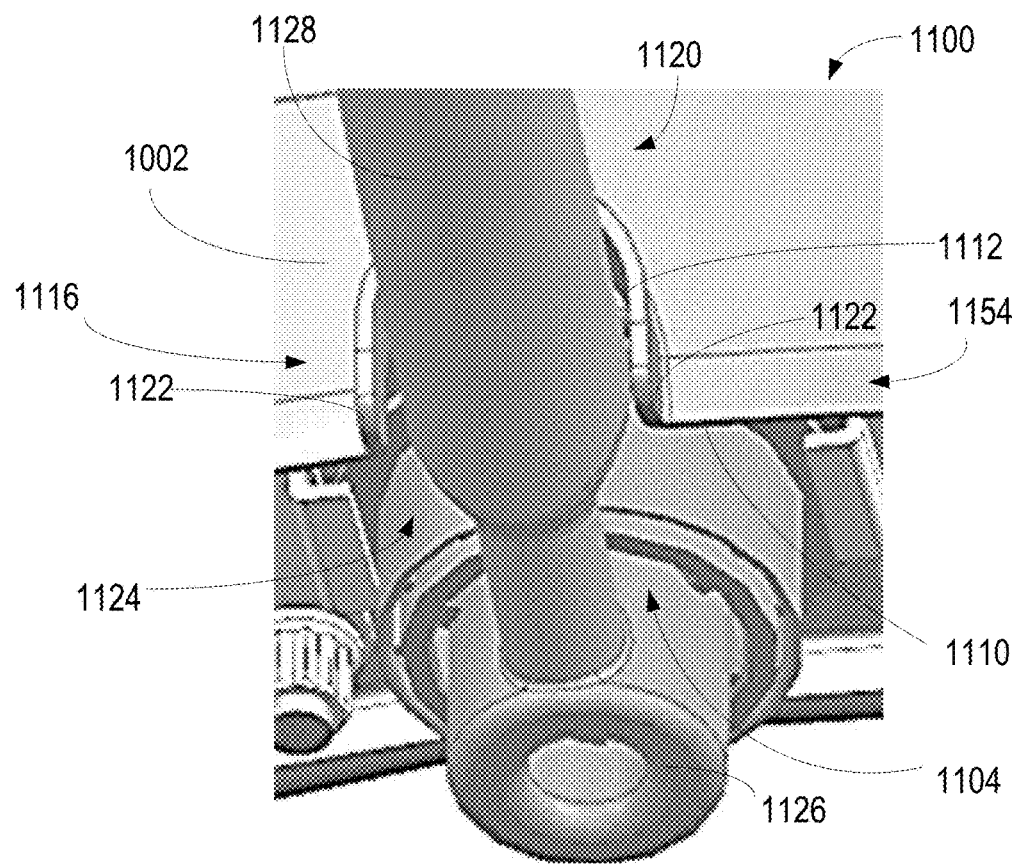
FIG. 11 is a perspective top view of a portion of another example combustion system illustrating an example of a cowl, a fuel nozzle having a head and a stem, and a combustor.

FIG. 11 is a perspective top view of a portion of another example combustion system 1100 illustrating an example of a cowl 1102, a fuel nozzle 1124 having a head 1126 and a stem 1128, and a combustor 1112. Similar to the previously discussed examples, the cowl 1102 includes a collar 1116 defining a notch 1104. For purposes of brevity, the discussion will focus on differences with the previously discussed combustion systems.

In FIG. 11, the collar 1116 is formed with a closed end 1120 to form a portion of a circle shape having a radius to partially surround the stem 1128 at a predetermined distance. The predetermined distance should be as close as possible as defined by the mechanical tolerance stack and the hot and cold states for the geometry. The coverage of the closed end 1120 of the collar 1116 around the circumference of the stem 1128 should be greater than half, as defined by the circumferential portion of a cylinder that intersects the cowl 1102. Where the cylinder is defined as on axis with the fuel nozzle stem 1128 and at a radius coincident with the peripheral edge 1110 of the cowl 1102.

As in previous examples, the distance between the stem 1128 and the collar 1116 is relatively small, (as small as possible for example) in the closed end 1120 to minimize the flow of pressurized air into the notch 1104. In this example, the cowl 1102 includes a projection region 1154 that does not extend beyond the end of the combustor 1112. In an example configuration, the cowl 1102 extends at or beyond an inlet of the majority of fuel nozzle swirlers, such as fuel swirlers surrounding the head 1126. Therefore a relatively small part of the head 1126 of the fuel nozzle 1124 is covered by the cowl 1102 and the amount of high pressure pressurized air radially flowing towards a centerline of the engine and then into the head 1126 may be higher since there is only a relatively small portion of the cowl 1102 forming an overhang or cover between the head 1126 and the outer wall 208 (FIG. 2). A pair of sidewalls 1122 may be spaced equidistantly and extending from the closed end 1120 to a peripheral edge 1110 of the cowl 1102, however due to the relatively short projection region 1154, the sidewalls 1122 are also relative short. Since the projection region 1154 and sidewalls 1122 are relatively short, and the width of the notch 1104 may remain constant between the closed end 1120 and the peripheral edge 1110, installation and removal of the fuel nozzle 1124 may be accomplished, while still minimizing the distance between the collar 1116 and the stem 1128.

Figure 12:
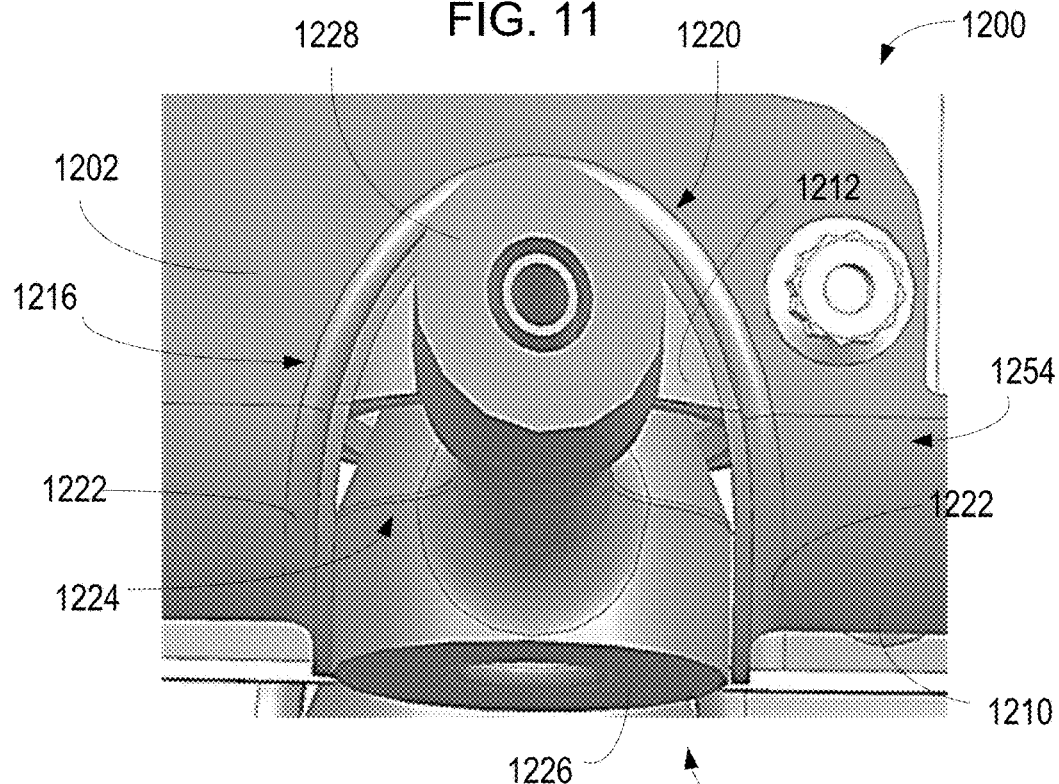
FIG. 12 is a perspective top view of a portion of another example combustion system illustrating an example of a cowl, a fuel nozzle having a head and a stem, and a combustor.

FIG. 12 is a perspective top view of a portion of another example combustion system 1200 illustrating an example of a cowl 1202, a fuel nozzle 1224 having a head 1226 and a stem 1228, and a combustor 1212. Similar to the previously discussed examples, the cowl 1202 includes a collar 1216 defining a notch 1204. For purposes of brevity, the discussion will focus on differences with the previously discussed combustion systems.

In FIG. 12, the collar 1216 is formed with a closed end 1220 to form a portion of an ellipsoidal shape having a radius to partially surround the stem 1128 at a predetermined distance. The predetermined distance should be as close as possible as defined by the mechanical tolerance stack and the hot and cold states for the geometry. The coverage of the collar 1216 circumferentially surrounding the stem 1128 should be greater than half the circumference of the stem 1228, as defined by the circumferential portion of a cylinder that intersects the cowl. Where the cylinder is defined as on axis with the fuel nozzle stem 1228 and at a radius coincident with the peripheral edge 1210 of the collar. As in previous examples, the distance between the stem 1228 and the collar 1216 is relatively small in the closed end 1220 to minimize the flow of pressurized air into the notch 1204. In this example, collar 1216 maintains the ellipsoid shape and extends to a peripheral edge 1210 of the cowl 1202 through a projection region 1254. A pair of sidewalls 1222 may form part of the ellipsoidal shape and maintain a relatively small predetermined distance between the sidewalls 1222 and the head 1226 to minimize the flow of pressurized air into the notch 1204. In this configuration, the fuel nozzle 1224 may be moved or positioned outwardly from the notch 1204, away from a projection region 1254 and the collar 1216 in order to perform installation or removal.

Figure 13:
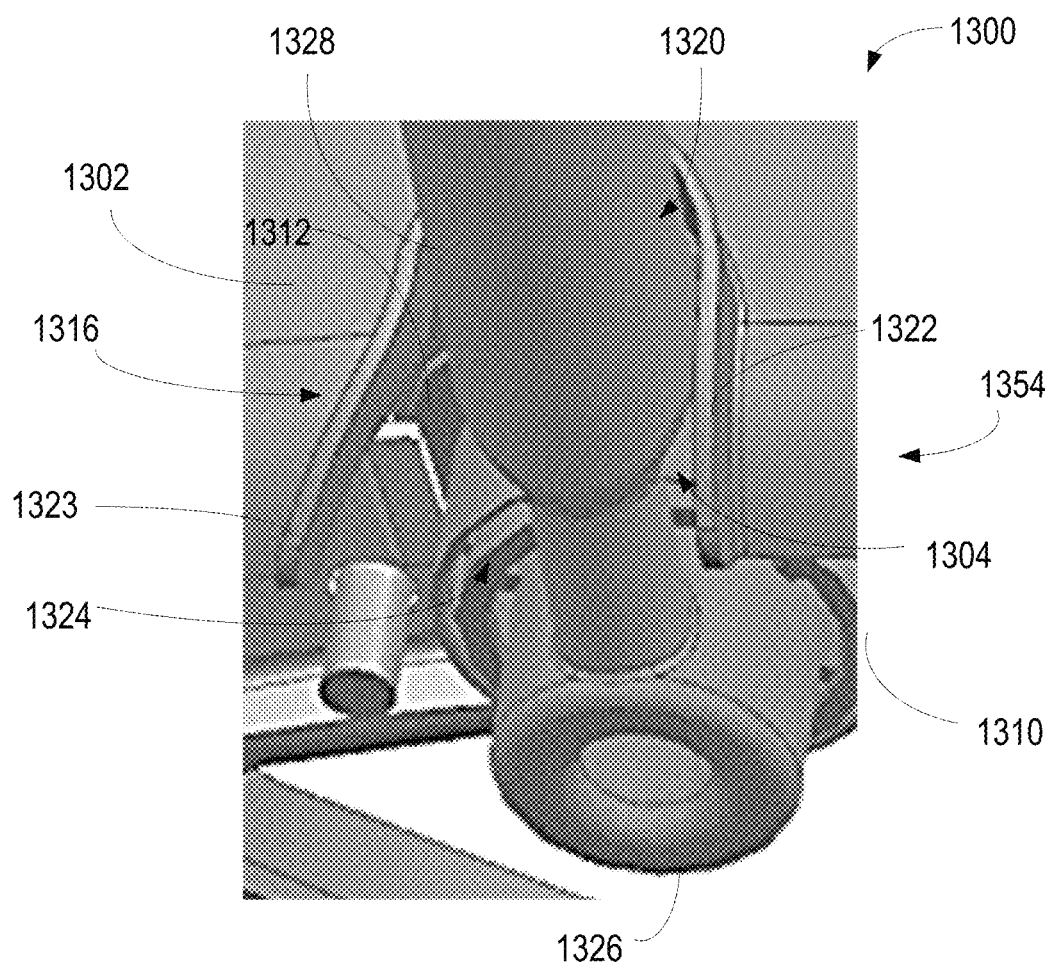
FIG. 13 is a perspective top view of a portion of yet another example combustion system illustrating an example of a cowl, a fuel nozzle having a head and a stem, and a combustor.

FIG. 13 is a perspective top view of a portion of another example combustion system 1300 illustrating an example of a cowl 1302, a fuel nozzle 1324 having a head 1326 and a stem 1328, and a combustor 1312. Similar to the previously discussed examples, the cowl 1302 includes a collar 1316 defining a notch 1304. For purposes of brevity, the discussion will focus on differences with the previously discussed combustion systems.

In FIG. 13, the collar 1316 is formed with a closed end 1320 to form a portion of a circle shape having a radius to partially surround the stem 1328 at a predetermined distance. The predetermined distance should be as close as possible as defined by the mechanical tolerance stack and the hot and cold states for the geometry. The coverage of the collar 1316 in surrounding the stem 1328 should be greater than half or the total circumference of the stem 1328, as defined by the circumferential portion of a cylinder that intersects the cowl 1302. Where the cylinder is defined as on axis with the fuel nozzle stem 1128 and at a radius coincident with the peripheral edge 1110 of the cowl 1302. As in previous examples, the distance between the stem 1328 and the collar 1316 is relatively small in the closed end 1320 to minimize the flow of pressurized air into the notch 1304. A first sidewall 1322 may be a straight member extending from the closed end 1320 to a peripheral edge 1310 of the cowl 1302 over an extension region 1354 of the cowl 1302. A second sidewall 1323 may be tapered and/or curved to redirect a projected flow path of a flow of pressurized air with minimized turbulence and/or introduction of non-laminar air flow by being aligned with the flow.

The second sidewall 1323 be laterally extend outwardly through the extension region 1354 to the peripheral edge 1310 such that an entrance of the notch 1324 is wider, thereby allowing installation and removal of the fuel nozzle 1324. In other examples, the second sidewall 1323 may be formed in other shapes to define the notch 1304 in accordance with minimizing the additional of turbulence to the flow of the pressurized air over the extension region of the cowl 1302. In addition, or alternatively, the first sidewall 1322 may be formed similar to the second sidewall 1323, or in any other shape in accordance with the flow of the pressurized air over the extension region of the cowl 1302. Thus, the width of the notch 1304 may widen between the closed end 1320 and the peripheral edge 1310 to allow for installation and removal of the fuel nozzle 1324, while still minimizing the distance between the collar 1316 and the stem 1328. In addition, since one or both of the first and second sidewalls 1322 and 1323 may be formed to re-direct the flow of pressurized air while minimizing the introduction of turbulence or other non-laminar behavior into the flow, a high velocity radial flow of air toward a centerline of the engine prior to entering into the head 1326 may be avoided.

Various example configurations of the cowl have been described. In other examples, the features described may be used in different configurations to redirect the flow of pressurized air. In all of the previously described examples the shape of the notch defined by the collar can be optimized for any of a number of design parameters such as minimizing a radial flow of pressurized high velocity air toward a centerline of the engine prior to entering into the head of the fuel nozzle, allowing for fuel nozzle extraction/installation, and ease of manufacturing of the combustion system.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure relates, among others, to the following aspects:

1. A gas turbine engine comprising:
   a fuel nozzle comprising a head and a stem, the stem configured to supply fuel to the head positioned at a proximate end of the stem;
   a combustion system comprising an outer wall defining at least part of a chamber, a distal end of the stem configured to couple with the outer wall and the stem configured to extend through the outer wall into the chamber so as to rigidly hold the head in position at an entrance to a combustor included in the chamber;
   a compressed air source configured to provide a pressurized flow of air into the chamber along an inner surface of the outer wall; and
   a cowl positioned in the chamber to direct at least part of the pressurized flow of air to the head, the cowl formed to include a notch through which at least part of the stem extends, an edge of the cowl defining the notch comprising a collar formed to extend from a surface of the cowl to direct the flow of air around the notch and to an inlet of the head.

2. The gas turbine engine of aspect 1, wherein the combustor is an axial flow combustion chamber positioned in an annulus of the chamber into which the pressurized flow of air is directed such that a direction of travel of the pressurized flow of air is reversed prior to being directed around the notch by the collar.

3. The gas turbine engine of aspects 1 or 2, wherein the cowl is coupled with the combustor and extends beyond an end of the combustor between at least part of the head and the inner surface of the outer wall.

4. The gas turbine engine as in any of aspects 1-3, wherein the collar extends orthogonal to a surface of the cowl toward the inner surface of the outer wall.

5. The gas turbine engine as in any of aspects 1-4, wherein the collar circumferentially surrounds a portion of stem and extends to a peripheral edge of the cowl.

6. The gas turbine engine as in any of aspects 1-5, wherein the collar is formed to define the notch so as to redirect a component of the flow of pressurized air to avoid the pressurized flow of air being in a radial direction toward a centerline of the engine through the notch to the head of the fuel nozzle.

7. The gas turbine engine as in any of aspects 1-6, wherein the collar is formed with an apex aligned with the direction of the pressurized flow of air.

8. The gas turbine engine as in any of aspects 1-7, wherein the pressurized flow of air is provided at a front end of the combustion system in a direction toward a back end of the combustion system along the inner surface of the outer wall, and the head of the fuel nozzle is also positioned near the front end of the combustion system such that the at least part of the pressurized flow of air flows back toward the front end of the combustion system and is directed to the head by the cowl.

9. A gas turbine engine comprising:
   a combustion system comprising an outer wall and an inner wall defining a chamber, an air inlet, and an air outlet, the air inlet being at the outer wall;
   a combustor disposed in the chamber between the outer wall and the inner wall;
   a fuel nozzle comprising a head disposed in an inlet of the combustor and a stem extending from the inlet of the combustor to the outer wall; and
   a cowl positioned between an external surface of the combustor and the outer wall, the cowl including a collar formed along a peripheral edge of the cowl as a notch to partially surround the stem.

10. The gas turbine engine of aspect 9, wherein the collar is formed as a continuous wall extending toward the outer wall orthogonal to a planar surface of the cowl.

11. The gas turbine engine of aspects 9 or 10, wherein the collar is formed to include a radius to partially surround the stem at a predetermined uniform distance from the stem.

12. The gas turbine engine as in any of aspects 9-11, wherein the collar includes a closed end formed to receive at least part of the stem, and a pair of laterally tapered sidewalls extending from the closed end to the peripheral edge of the cowl to form an open end.

13. The gas turbine engine of aspect 12, wherein the closed end is round.

14. The gas turbine engine as in any of aspects 9-13, wherein the air inlet is outboard of the combustor chamber.

15. The gas turbine engine as in any of aspects 9-14, wherein the collar is formed and position to redirect a flow of pressurized air supplied from the air inlet away from entry to the notch.

16. The gas turbine engine of aspect 15, wherein the cowl comprises a vane configured to direct the flow of pressurized air to the fuel nozzle.

17. A method of operating a gas turbine engine comprising:
- positioning a combustor in a chamber formed by an outer combustion case and an inner combustion case;
- coupling a stem of a fuel nozzle to the outer combustion case;
- extending the stem of the fuel nozzle into the chamber such that a head of the fuel nozzle is disposed in an inlet of the combustor;
- supplying a flow of compressed air to the chamber by supplying the flow of compressed air at an inner surface of the outer combustion case;
- redirecting the flow of compressed air with a cowl positioned between the outer combustion case and the combustion chamber, wherein the cowl includes a notch defined by a collar partially surrounding the stem; and
- redirecting the flow of compressed air around the notch with the collar.

18. The method of aspect 17, wherein the flow of compressed air entering the chamber is flowing in a first direction, at least a portion of the flow of compressed air is redirected within the chamber to flow in a second direction that is opposite the first direction before being redirected with the cowl.

19. The method of aspects 17 or 18, wherein redirecting the flow of compressed air with a cowl comprises minimizing, with the cowl, the flow of compressed air in a direction radial to a central axis of the gas turbine engine before entry into the head of the fuel nozzle.

20. The method as in any of aspects 17-19, further comprising aligning, with the cowl, the flow of compressed air to flow tangentially to a central axis of the gas turbine engine prior to flowing axially with a central axis of the head of the fuel nozzle.

We claim:

1. A gas turbine engine comprising:
   a fuel nozzle comprising a head and a stem, the stem configured to supply fuel to the head positioned at a proximate end of the stem;
   a combustion system comprising an outer wall defining at least part of a chamber, a distal end of the stem configured to couple with the outer wall and the stem configured to extend through the outer wall into the chamber so as to rigidly hold the head in position at an entrance to a combustor included in the chamber;
   a compressed air source configured to provide a pressurized flow of air into the chamber along an inner surface of the outer wall; and
   a cowl positioned in the chamber to direct at least part of the pressurized flow of air to the head, the cowl formed to include a notch through which at least part of the stem extends, an edge of the cowl defining the notch comprising a collar formed to extend from a surface of the cowl to direct the flow of air around the notch and to an inlet of the head.

2. The gas turbine engine of claim 1, wherein the combustor is an axial flow combustion chamber positioned in an annulus of the chamber into which the pressurized flow of air is directed such that a direction of travel of the pressurized flow of air is reversed prior to being directed around the notch by the collar.

3. The gas turbine engine of claim 1, wherein the cowl is coupled with the combustor and extends beyond an end of the combustor between at least part of the head and the inner surface of the outer wall.

4. The gas turbine engine of claim 1, wherein the collar extends orthogonal to a surface of the cowl toward the inner surface of the outer wall.

5. The gas turbine engine of claim 1, wherein the collar circumferentially surrounds a portion of stem and extends to a peripheral edge of the cowl.

6. The gas turbine engine of claim 1, wherein the collar is formed to define the notch so as to redirect a component of the flow of pressurized air to avoid the pressurized flow of air being in a radial direction toward a centerline of the engine through the notch to the head of the fuel nozzle.

7. The gas turbine engine of claim 1, wherein the collar is formed with an apex aligned with the direction of the pressurized flow of air.

8. The gas turbine engine of claim 1, wherein the pressurized flow of air is provided at a front end of the combustion system in a direction toward a back end of the combustion system along the inner surface of the outer wall, and the head of the fuel nozzle is also positioned near the front end of the combustion system such that the at least part of the pressurized flow of air flows back toward the front end of the combustion system and is directed to the head by the cowl.

9. A gas turbine engine comprising:
   a combustion system comprising an outer wall and an inner wall defining a chamber, an air inlet, and an air outlet, the air inlet being at the outer wall;
   a combustor disposed in the chamber between the outer wall and the inner wall;
   a fuel nozzle comprising a head disposed in an inlet of the combustor and a stem extending from the inlet of the combustor to the outer wall; and
   a cowl positioned between an external surface of the combustor and the outer wall, the cowl including a collar formed along a peripheral edge of the cowl as a notch to partially surround the stem.

10. The gas turbine engine of claim 9, wherein the collar is formed as a continuous wall extending toward the outer wall orthogonal to a planar surface of the cowl.

11. The gas turbine engine of claim 9, wherein the collar is formed to include a radius to partially surround the stem at a predetermined uniform distance from the stem.

12. The gas turbine engine of claim 9, wherein the collar includes a closed end formed to receive at least part of the stem, and a pair of laterally tapered sidewalls extending from the closed end to the peripheral edge of the cowl to form an open end.

13. The gas turbine engine of claim 12, wherein the closed end is round.

14. The gas turbine engine of claim 9, wherein the air inlet is outboard of the combustor chamber.

15. The gas turbine engine of claim 9, wherein the collar is formed and position to redirect a flow of pressurized air supplied from the air inlet away from entry to the notch.

16. The gas turbine engine of claim 15, wherein the cowl comprises a vane configured to direct the flow of pressurized air to the fuel nozzle.

17. A method of operating a gas turbine engine comprising:
- positioning a combustor in a chamber formed by an outer combustion case and an inner combustion case;
- coupling a stem of a fuel nozzle to the outer combustion case;
- extending the stem of the fuel nozzle into the chamber such that a head of the fuel nozzle is disposed in an inlet of the combustor;
- supplying a flow of compressed air to the chamber by supplying the flow of compressed air at an inner surface of the outer combustion case;
- redirecting the flow of compressed air with a cowl positioned between the outer combustion case and the combustion chamber, wherein the cowl includes a notch defined by a collar partially surrounding the stem; and
- redirecting the flow of compressed air around the notch with the collar.

18. The method of claim 17, wherein the flow of compressed air entering the chamber is flowing in a first direction, at least a portion of the flow of compressed air is redirected within the chamber to flow in a second direction that is opposite the first direction before being redirected with the cowl.

19. The method of claim 17, wherein redirecting the flow of compressed air with a cowl comprises minimizing, with the cowl, the flow of compressed air in a direction radial to a central axis of the gas turbine engine before entry into the head of the fuel nozzle.

20. The method of claim 17, further comprising aligning, with the cowl, the flow of compressed air to flow tangentially to a central axis of the gas turbine engine prior to flowing axially with a central axis of the head of the fuel nozzle.

* * * * *